(12) United States Patent
Balch et al.

(10) Patent No.: US 7,604,837 B2
(45) Date of Patent: Oct. 20, 2009

(54) NONLINEAR POLYSILOXANE CONTAINING COATINGS WITH IMPROVED ADHESION PROPERTIES

(75) Inventors: Thomas C. Balch, West Bloomfield, MI (US); David K. Lau, Royal Oak, MI (US); Peter Betz, Münster (DE); Gudrun Wiemann, Telgte (DE); Donald H. Campbell, Hartland, MI (US); Vicki Lynn Berry, Midland, MI (US); Kenneth Christopher Fey, Midland, MI (US); John B. Horstman, Midland, MI (US); Randall Gene Schmidt, Midland, MI (US); Lori Sutton-Poungthana, Saginaw, MI (US); Gary Michael Wieber, Midland, MI (US); Gerald Lawrence Witucki, Midland, MI (US)

(73) Assignee: BASF Coatings AG (DE)

( * ) Notice: Subject to any disclaimer, the term of this patent is extended or adjusted under 35 U.S.C. 154(b) by 243 days.

(21) Appl. No.: 11/277,256

(22) Filed: Mar. 23, 2006

(65) Prior Publication Data

US 2007/0225432 A1 Sep. 27, 2007

(51) Int. Cl.
*B05D 3/12* (2006.01)
*B05D 3/02* (2006.01)

(52) U.S. Cl. ............... 427/140; 427/142; 427/299; 427/387; 525/100

(58) Field of Classification Search .............. None
See application file for complete search history.

(56) References Cited

FOREIGN PATENT DOCUMENTS

| DE | 3014411 | A1 | 4/1980 |
|---|---|---|---|
| DE | 19940858 | A1 | 8/1999 |
| EP | 0995778 | A2 | 4/2000 |
| WO | WO 2005/037887 | A1 * | 4/2005 |

OTHER PUBLICATIONS

International Search Report and the Written Opinion of the International Searching Authorite for PCT/US2007/064741 Filed Mar. 23, 2007.

* cited by examiner

*Primary Examiner*—Marc S Zimmer
(74) *Attorney, Agent, or Firm*—Harness, Dickey & Pierce, P.L.C.

(57) ABSTRACT

A coating composition, particularly a clearcoat composition, which may be a two-component clearcoat composition, comprises a film-forming material, a crosslinking agent, and a nonlinear polysiloxane polymer having a functional group reactive with the crosslinking agent. The coating composition exhibits excellent scratch resistance and adhesion of repair coating layers and sealants, such as windshield sealants.

8 Claims, No Drawings

NONLINEAR POLYSILOXANE CONTAINING COATINGS WITH IMPROVED ADHESION PROPERTIES

FIELD OF THE INVENTION

The invention relates to nonlinear polysiloxane containing industrial and automotive coating compositions, particularly for topcoats or coatings forming the outermost layer of composite coatings, with improved adhesion.

BACKGROUND OF THE INVENTION

Silicon-containing materials have been introduced into coating compositions to increase the resistance of coatings to surface scratching and marling. A coating layer with silicon-containing materials may have poor adhesion with subsequently applied coating layers, however, due to the low surface tension produced by the silicon atoms. Generally, when the silicon-containing materials are added to the outer coating layer for scratch and mat resistance it is contemplated that no further coating layer will be applied over this outer coating layer. It sometimes becomes necessary to apply a further layer, however, such as when a defect in the outer coating must be repaired by applying a repair coating layer. A successful repair requires good adhesion of the repair coating layer to the underlying coating layer, which may be compromised when the underlying coating layer includes silicon-containing materials. Extra steps must then be taken to assure good adhesion of the repair coat, for example sanding and cleaning the under lying coating before applying the repair coating layer.

Additionally, windshield sealants or other sealants applied over the topcoats and clearcoats must adhere to the topcoats and clearcoats. Silicon-containing materials in the topcoat or clearcoat layer may again interfere with forming a strong bond between the sealant and the coated surface onto which it is applied.

SUMMARY OF THE INVENTION

In one aspect, the invention provides coating compositions containing a film-forming polymer, a crosslinking agent, and a nonlinear polysiloxane polymer having a functional group reactive with the crosslinking agent and the topcoat and clearcoat layers produced from such compositions.

The present invention further provides coating compositions containing a nonlinear polysiloxane polymer polymerized from a monomer mixture comprising at least about 20 mole percent of a siloxane monomer that is trifunctional with respect to the siloxane polymerization reaction, at least about 10 mole percent of a monomer that is monofunctional with respect to the siloxane polymerization reaction and that contains at least one functional group reactive with another component of the coating composition or that is derivatized to be reactive with another component of the coating composition after polymerization, and up to about 30 mole percent of a monomer that is tetrafunctional with respect to the polymerization reaction. The nonlinear polysiloxane polymer has a number average molecular weight of about −500 to about 10,000 and a weight average molecular weight of about 1000 to about 200,000. The invention also provides cured clearcoat coatings produced from such compositions.

In another aspect, the invention provides two-component clearcoat compositions, comprising a first package comprising a film-forming material and a nonlinear polysiloxane with a functional group and a curing agent package comprising a curing agent reactive with the functional group of the nonlinear polysiloxanes and reactive with the film-forming material, as well as cured clearcoat coatings produced from such compositions.

The topcoats and clearcoats of the invention provide excellent scratch and maw resistance while providing adhesion for subsequent repair coating layers and sealants (such as used in windshield installation) without use of special preparations or adhesive primers.

"A" and "an" as used herein indicate "at least one" of the item is present; a plurality of such items may be present, when possible "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

The topcoat and clearcoat coating compositions of the invention include a film-forming material, a crosslinking agent (also known as a curing agent), and a nonlinear polysiloxane polymer having a functional group reactive with the crosslinking agent.

In particular embodiments, the topcoat is a clearcoat composition, particularly an automotive clearcoat composition. In certain embodiments, the clearcoat compositions are two-package, also known as two-component or 2K, compositions in which a first package comprises the film-forming material and the nonlinear polysiloxanes polymer and a second package, kept separate until just before use, comprises the crosslinking agent. Two-component coatings are well-known in the art. The two components are combined just before application of the coating onto a desired substrate. After the two components are combined, the mixed coating composition has a limited (but usefully long) pot life.

The nonlinear polysiloxane polymer has a functional group reactive with the crosslinking agent. The nonlinear polysiloxane is prepared using at least one siloxane monomer having more than two polymerizable group that react during the polymerization reaction and at least one monomer having a functional group that is not reacted during the polymerization reaction. The nonlinear polysiloxane may be prepared using at least about 20 mole percent of a siloxane monomer having three groups reactive during polymerization ["tri-functional siloxane monomer"], and at least about 13 mole percent of a siloxane monomer having a single group reactive during polymerization ["monofunctional siloxane monomer"] having a group reactive with, or that can be derivatized to be reactive with, a component of the coating vehicle. A particular example of the crosslinkable monofunctional siloxane monomer reactive with the crosslinked comprises the structure —OSi $R_s$—(ROH), in which R is a propylene group or isopropylene group and each R' is independently selected from hydrocarbyl groups, preferably aliphatic hydrocarbyl groups, and more preferably each R' is methyl. The hydroxyl group may be used as the reactive group when the crosslinker is reactive with hydroxyl, e.g. when the crosslinker is isocyanate-functional or an aminoplast crosslinker. The hydroxyl group may also be derivatized to provide a different functionality for later reaction with a crosslinking agent or for compatibility of the nonlinear polysiloxane in the coating composition. Example of such different functionalities include, without limitation, carbamate group (e.g., by reaction with a hydroxyalkyl carbamate), acid group (e.g., by reaction with a cyclic anhydride), or epoxide group (e.g., by reaction with epichlorohydrin).

In some embodiments, the tri-functional siloxane monomer may be at least about 50 mole percent, more preferably at least about 65 mole percent of the monomer mixture used to prepare the nonlinear polysiloxane. The tri-functional siloxane monomer may be up to about 90 mole percent, more preferably up to about 80 mole percent of the monomer mixture used to prepare the nonlinear polysiloxane. In some preferred embodiments, the nonlinear polysiloxane is polymerized using from about 20 to about 90 mole percent, more preferably from about 50 to about 80 mole percent, still more preferably from about 65 to about 80 mole percent of the tri-functional siloxane monomer in the monomer mixture.

In some embodiments, the monofunctional siloxane monomer having a group reactive with, or that can be derivatized to be reactive with, a component of the coating vehicle may be at least about 1 mole percent, more preferably at least about 5 mole percent of the monomer mixture used to prepare the nonlinear polysiloxane. The mono-functional siloxane monomer may be up to about 80 mole percent, more preferably up to about 30 mole percent of the monomer mixture used to prepare the nonlinear polysiloxane. In some preferred embodiments, the nonlinear polysiloxane is polymerized using from about 1 to about 80 mole percent, more preferably from about 5 to about 30 mole percent, still more preferably from about 10 to about 20 mole percent of the mono-functional siloxane monomer in the monomer mixture.

The nonlinear polysiloxane may be polymerized using siloxane monomer that has four polymerizable groups ["tetra-functional siloxane monomer"] In some preferred embodiment, the polymerization monomer mixture includes up to 30 mole percent of tetra-functional siloxane monomer. In some embodiments, the polymerization monomer mixture comprises essentially mono-functional siloxane monomer, tri-functional siloxane monomer, and, optionally, tetra-functional siloxane monomer.

The silicon atoms of the nonlinear polysiloxane preferably are free of pendant phenyl groups for achieving improved scratch and mar resistance effectively.

The nonlinear polysiloxane may have a number average molecular weight in the range of about 500 to about 10,000. In some preferred embodiments, the number average molecular weight is in the range of from about 500 to about 8000. The nonlinear polysiloxane may have a weight average molecular weight in the range of about 1000 to about 200,000. In some preferred embodiments, the weight average molecular weight is in the range of from about 1000 to about 80,000

The nonlinear polysiloxane may be included in the topcoat, more preferably clearcoat, coating composition in amounts preferably between about 0.1 and about 10% by weight, more preferably from about 0.4 to about 5% by weight, based on the weight of vehicle. "Vehicle" refers to the film-forming materials in the coating composition.

The nonlinear polysiloxane polymer is included in the coating composition along with the film-forming material and the crosslinking agent. When the clearcoat composition is a two-component clearcoat composition, the crosslinking agent is contained in a separate package from the film forming material and the polysiloxanes. The separate packages awe combined just prior to application of the mixture to the substrate, and the mixed coating composition has a finite pot life.

The crosslinking agent may be an unblocked polyisocyanate. Suitable examples of such unblocked polyisocyanates include, without limitation, polyisocyanates having from 2 to 5 isocyanate groups per molecule, including those polyisocyanates containing isocyanurate, biuret, allophanate, iminooxadiazinedione, urethane, urea and/or uretdione groups. Polyisocyanates containing urethane groups, for example, are prepared by reacting some of the isocyanate groups with polyols, such as trimethylolpropane and glycerol, for example. Preference is given to the use of aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate, dicyclohexylmethane 4,4'-diisocyanate, or 1,3-bis(isocyanatomethyl)cyclohexane (BIC), diisocyanates derived from dimeric fatty acids, as marketed under the commercial designation DDI 1410 by Henkel, 1,8-diisocyanato-4-isocyanatomethyloctane, 1,7-diisocyanato-4-isocyanatomethylheptane or 1-iso-cyanato-2-(3-isocyanatopropyl) cyclohexane, or mixtures of these polyisocyanates.

When the crosslinking agent is an unblocked polyisocyanate, the film-forming material and the nonlinear polysiloxanes polymer have functional groups reactive with isocyanate groups. Functional groups reactive with isocyanate groups include, without limitation, hydroxyl groups, primary and secondary amine groups, carboxylic acids, amides, and activated methylene groups. In certain embodiments, the film-forming material includes a polymer having hydroxyl groups. The polymer may be, without limitation, an acrylic polymer, polyurethane polymer, polyester, and combinations thereof. Hydroxyl functionality can conveniently be introduced to the polymer by copolymerizing at least one hydroxyl-functional monomer. The hydroxy-functional ethylenically unsaturated monomer is preferably an alkyl ester of acrylic or methacrylic acid. (In the context of describing the present invention, the term "(meth)acrylate" will be used to indicate that both the methacrylate and acrylate esters are included.) Suitable examples of hydroxyl-functional monomers include, without limitation, hydroxyethyl (meth)acrylate, hydroxypropyl (meth)acrylates, hydroxybutyl (meth)acrylates, hydroxyhexyl (meth)acrylates, other hydroxyalkyl (meth)acrylates having branched or linear alkyl groups of up to about 10 carbons, and mixtures of these. The hydroxyl-functional, ethylenically unsaturated monomer may also be a reaction product of an epoxide functional, ethylenically unsaturated monomer with a monocarboxylic acid, for example the reaction product of glycidyl (meth)acrylate with neodecanoic acid. If desired, the coating may also include materials that cure through application of actinic radiation, for example any of those disclosed in Baumngart et al., U.S. Pat. No. 6,777,090.

In other embodiments, the crosslinking agent may be or include a blocked polyisocyanate, such as one of the polyisocyanates already mentioned blocked with a group that will de-block at the desired cure temperature, an aminoplast crosslinker, or polycarboxylic acid in the case of an epoxide-functional polymer. Useful aminoplast crosslinkers include, without limitation, materials having active methylol or methylalkoxy groups. Examples of such curing agent compounds include melamine formaldehyde crosslinkers, including monomeric or polymeric melamine formaldehyde resin and partially or fully alkylated melamine formaldehyde resin, urea resins, and methylol ureas such as urea formaldehyde resin, alkoxy ureas such as butylated urea formaldehyde resin.

The clearcoat coating composition may include a catalyst to enhance the cure reaction. For example, especially when monomeric melamines are used as a curing agent, a strong acid catalyst may be utilized to enhance the cure reaction. Such catalysts are well-known in the art and include, without limitation, p-toluene sulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. For the reaction of polyisocyanates with suitable functionalities, other suitable catalysts include tin compounds such as dibutyl tin dilaurate, dibutyl tin diacetate, dibutyl tin oxide, tertiary amines, zinc salts, and manganese salts.

The same film-forming materials may be used with blocked polyisocyanate crosslinkers and aminoplast crosslinkers as with the unblocked polyisocyanate crosslinkers. Carbamate-functional film-forming materials may be used with aminoplast crosslinkers. Such materials are extensively described in coatings patent literature, such as in U.S. Pat. Nos. 6,331,596, 6,391,968, 6,541,577, 6,710,138, and 6,858,693, all assigned to BASF Corporation, and all of which are incorporated herein by reference.

A solvent or solvents may be utilized in the coating composition used in the practice of the present invention. In general, the solvent can be any organic solvent and/or water. In one preferred embodiment, the solvent includes a polar organic solvent. More preferably, the solvent includes one or more organic solvents selected from polar aliphatic solvents or polar aromatic solvents. Still more preferably, the solvent includes a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrolidone, blends of aromatic hydrocarbons, and mixtures of these. In another preferred embodiment, the solvent is water or a mixture of water with small amounts of co-solvents.

The coating composition according to the invention is useful as the clearcoat of an automotive composite color-plus-clear coating. Additional agents, for example surfactants, stabilizers, wetting agents, rheology control agents, dispersing agents, adhesion promoters, UV absorbers, hindered amine light stabilizers, etc. may be incorporated into the coating composition.

Coating compositions can be coated on the article by any of a number of techniques well-known in the art. These include, for example, spray coating, dip coating, roll coating, curtain coating, and the like. For automotive body panels, splay coating is preferred.

The coating composition according to the invention is used as the clearcoat of a composite color-plus-clear coating. The pigmented basecoat composition over which it is applied may be any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available fox the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The clearcoat coating composition is generally applied wet-on-wet over a basecoat coating composition as is widely done in the industry. The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources, generally temperatures between 90° C. and 180° C. In certain embodiments, the cure temperature may be between 115° C. and 150° C., and typically temperatures between 115° C. and 140° C. are used for a blocked acid-catalyzed system. For an unblocked acid-catalyzed system, the cute temperature typically may be between 80° C. and 100° C. The curing time will vary depending on the particular components used, and physical parameters such as the thickness of the layers; however, typical curing times range from 15 to 60 minutes, and more generally 15-25 minutes for blocked acid-catalyzed systems and 10-20 minutes for unblocked acid-catalyzed systems. The curing times may also be expressed as time after metal temperature reaches the bake temperature ("metal temperature"). For example, the curing time may be for 5 to 30 minutes, preferably 10 to 20 minutes, at metal temperature.

In a method for repairing the clearcoat layer of an automotive coating, the clearcoat layer of the invention is sanded, if necessary, to remove a defect, then a new basecoat layer and the clearcoat coating composition of the invention is applied over at least a portion of the clearcoat layer to form a second clearcoat layer, which is then cured, The new basecoat layer and second clearcoat layer may be cured at the times and temperatures already mentioned. The clearcoat composition of the invention provides significantly improved adhesion of the subsequent repair coating, even without sanding of the first (original) clearcoat layer, and even for a 2K (e.g., unblocked polyisocyanate crosslinker) system, which is generally susceptible to adhesion failure of the repair coat when there is no sanding of the first clearcoat before the repair coats are applied. The adhesion is excellent even in severe original clearcoat overbake/repair coat underbake conditions, for example as tested by an original clearcoat layer cute of 90 minutes at 152° C. and a repair clearcoat layer cure of 15 minutes at 132° C.

Coating compositions containing the siloxane polymer exhibit excellent scratch resistance and adhesion of repair coating layers and sealants, such as windshield sealants.

The invention is illustrated by the following examples. The examples are merely illustrative and do not in any way limit the scope of the invention as described and claimed. All parts are parts by weight unless otherwise noted.

EXAMPLE

Example 1

Clearcoat Composition and Coating of the Invention

A 2K (two-part) clear coat coating composition having a first package and a curing agent package is prepared by combining 67.22 parts by weight of an acrylic resin (65 weight percent solution, 302 hydroxyl equivalent weight), 22.0 parts by weight of a mixture of organic solvents, 3.68 parts of a mixture of coating additives, 8.52 parts by weight of a theology control additive, and 7.87 parts by weight of a silicone resin (25 mole percent —OSi(CH$_3$)$_2$((CH)$_2$OH), 72.7 mole percent

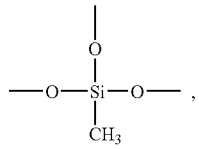

balance —OSi(CH$_3$)$_2$O—) to form a first package. The curing agent package is prepared by combining 29.39 parts by weight of organic solvents, 49.32 parts by weight. Desmophen N-3390 (from Bayer), and 21.29 parts by weight. Desmodur Z-4470 (from Bayer).

A clearcoat coating material is prepared by combining 100 parts by weight of the first package and 33.64 parts by weight of the curing agent package. The clearcoat coating material is applied in a clearcoat layer over a previously applied and flash-dried layer of 0.7 mil of waterborne black basecoat on a primed steel panel. The clearcoat composition is spray applied over the basecoat to approximately 2.0 mils thickness. The clearcoat is then flashed at ambient temperature for 10 minutes and cured at 140° C. for 20 minutes. The composite clearcoat-basecoat coating obtained has excellent scratch and mar resistance.

A portion of the composite clearcoat-basecoat coating is subjected to a high bake repair by applying another layer of the same basecoat followed by another layer of the clearcoat material in the same way as before, and again curing at 140° C. for 20 minutes. The repaired portion is tested for repair coat adhesion with a 2 mm adhesion test blade from Paul N. Gardner Company, Inc. The repaired portion has excellent adhesion.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A coating composition, comprising a film-forming material, a crosslinking agent, and a nonlinear polysiloxane polymer is free of pendant phenyl groups on silicon atoms, wherein the polymer is polymerized from a monomer mixture consisting of at least about 20 mole percent of a siloxane monomer that is trifunctional with respect to the siloxane polymerization reaction, at least about 10 mole percent of a monomer that is monofunctional with respect to the polymerization reaction and that contains at least one hydroxyl functional group reactive with the crosslinking agent, and optionally up to about 30 mole percent of a monomer that is tetrafunctional with respect to the polymerization reaction, and wherein said coating composition is an automotive clearcoat.

2. A coating composition according to claim 1, comprising from about 0.1 to about 10% by weight of the nonlinear polysiloxane polymer, based on weight of the coating composition vehicle.

3. An article having thereon a coating layer produced from the composition of claim 1.

4. A coating composition according to claim 1, wherein the nonlinear polysiloxane is polymerized from at least one crosslinkable monofunctional siloxane monomer comprising a structure —OSiR'$_2$—(ROH), in which R is a propylene group or isopropylene group and each R' is independently selected from hydrocarbyl groups.

5. A coating composition according to claim 4, wherein each R' is methyl.

6. A method of repairing a coating composition, comprising:
    applying a coating composition to a substrate and curing the applied coating composition to form an original layer;
    applying the coating composition over at least a portion of the original layer and curing the applied coating composition over the original layer to form a second layer;
    wherein the coating composition comprises a film-forming material, a crosslinking agent, and a nonlinear polysiloxane polymer free of pendant phenyl groups on silicon atoms, wherein the polysiloxane polymer is polymerized from a monomer mixture consisting of at least about 20 mole percent of a siloxane monomer that is trifunctional with respect to the siloxane polymerization reaction, at least about 10 mole percent of a monomer that is monofunctional with respect to the polymerization reaction and that contains at least one hydroxyl functional group reactive with the crosslinking agent, and optionally up to about 30 mole percent of a monomer that is tetrafunctional with respect to the polymerization reaction.

7. A method of claim 6, further comprising sanding prior to applying said coating composition, wherein a defect is removed from the surface by the sanding.

8. A method of claim 6, wherein said coating composition is an automotive clearcoat.

* * * * *

UNITED STATES PATENT AND TRADEMARK OFFICE
CERTIFICATE OF CORRECTION

PATENT NO. : 7,604,837 B2  Page 1 of 1
APPLICATION NO. : 11/277256
DATED : October 20, 2009
INVENTOR(S) : Balch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 454 days.

Signed and Sealed this

Fifth Day of October, 2010

David J. Kappos
*Director of the United States Patent and Trademark Office*